United States Patent [19]

Narayanan

[11] 3,711,538

[45] Jan. 16, 1973

[54] DELTA 2,ALPHA-ADAMANTANEACETANILIDE DERIVATIVES AND RELATED COMPOUNDS

[75] Inventor: Venkatachala Lakshmi Narayanan, North Brunswick, N.J.

[73] Assignee: E. R. Squibb & Sons, Inc., New York, N.Y.

[22] Filed: Jan. 11, 1971

[21] Appl. No.: 105,711

Related U.S. Application Data

[63] Continuation-in-part of Ser. No. 32,768, April 28, 1970, abandoned, which is a continuation-in-part of Ser. No. 725,892, May 1, 1968, abandoned.

[52] U.S. Cl.........260/557 B, 260/240 R, 260/468 B, 260/514 B, 260/575, 260/578, 260/586 R, 260/592, 260/570.7, 260/609 R, 260/622 R, 260/646, 424/244, 424/246, 424/248, 424/250, 424/267, 424/274, 424/324

[51] Int. Cl............................................C07c 103/78
[58] Field of Search.......................260/557, 240

[56] References Cited

UNITED STATES PATENTS 3,225,093   12/1965   Krapcho..............................260/557

*Primary Examiner*—Harry I. Moatz
*Attorney*—Lawrence S. Levinson, Merle J. Smith and Donald J. Perrella

[57] ABSTRACT

This invention relates to new $\Delta^2,\alpha$-adamantaneacetanilide derivatives and related compounds of the formula

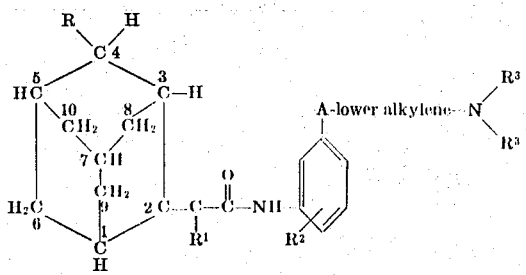

and acid addition salts thereof, substances useful in cardiovascular disorders and serotonin inhibition.

11 Claims, No Drawings

DELTA 2,ALPHA-ADAMANTANEACETANILIDE DERIVATIVES AND RELATED COMPOUNDS

This application is a continuation-in-part of application Ser. No. 32,768, filed Apr. 28, 1970, now abandoned, which in turn is a continuation-in-part of application Ser. No. 725,892, filed May 1, 1968, now abandoned.

SUMMARY OF THE INVENTION

This invention relates to new bases of the formula

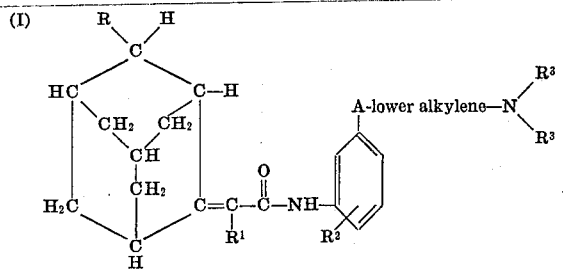

wherein R represents hydrogen, halogen or lower alkyl; $R^1$ represents hydrogen or lower alkyl; $R^2$ represents hydrogen, halogen, trifluoromethyl, nitro, amino, lower alkyl, lower alkoxy or lower alkanoyl, especially hydrogen, halogen or lower alkyl; A represents oxa (—O—), thia (—S—), sulfonyl (—$SO_2$—), carbonyl

or hydroxymethylene [—CH(OH)—]; and

is a basic nitrogen containing radical of up to about 18 atoms, and acid addition salts of those bases.

DETAILED DESCRIPTION OF THE INVENTION

In formula I the lower alkyl groups represented by the symbols include straight and branched chain saturated aliphatic groups of up to seven carbon atoms such as methyl, ethyl, propyl, isopropyl, t-butyl, amyl, isoamyl, hexyl and the like. The lower alkoxy groups contain alkyl groups of the same character attached to the oxygen atom. Similarly, the lower alkylene groups are divalent radicals of the same kind. In each instance the one and two carbon members are preferred, especially the first.

Each of the four common halogens in contemplated by the term "halo," but chlorine and bromine are preferred.

The lower alkanoyl groups are the acyl moieties derived from lower fatty acids of up to seven carbon atoms, including for example, acetyl, propionyl, butyryl and the like.

In the basic nitrogen containing radical (II)

in formula I, each $R_3$ represents hydrogen, adamantyl, lower alkyl, hydroxy-lower alkyl and phenyl-lower alkyl forming such basic groups as amino, lower alkylamino, e.g., methylamino, ethylamino, di(lower alkyl)amino, e.g., dimethylamino, diethylamino, dipropylamino, (hydroxy-lower alkyl)amino, e.g., hydroxyethylamino, di(hydroxy-lower alkyl)amino, e.g., di(hydroxyethyl)amino, (phenyl-lower alkyl)amino, e.g., benzylamino, phenethylamino, N-(lower alkyl) (phenyl lower alkyl)amino, e.g., N-methylbenzylamino, 1-adamantylamino, and the like.

In addition the nitrogen may join with the groups represented by $R^3$ to form a 5 to 7 membered monocyclic heterocyclic containing, if desired, an oxygen, sulfur or an additional nitrogen atom, (not more than two hetero atoms altogether). The heterocyclic group may also be substituted by one or two groups.

Thus heterocyclic groups represented by the radical II include for example, piperidino, di(lower alkyl)piperidino, e.g., 2,3-dimethylpiperidino, 2-, 3- or 4-(lower alkoxy)piperidino, e.g., 2-methoxypiperidino, 2-, 3- or 4-(lower alkylpiperidino), e.g., 2-, 3- or 4-methylpiperidino, pyrrolidino, (lower alkyl)-pyrrolidino, e.g., 2-methylpyrrolidino, di(lower alkyl)pyrrolidino, e.g., 2,3-dimethylpyrrolidino, (lower alkoxy)pyrrolidino, e.g., 2-ethoxypyrrolidino, morpholino, (lower alkyl)morpholino, e.g., 2-methylmorpholino, di(lower alkyl)morpholino, e.g., 2,3-dimethylmorpholino, (lower alkoxy)morpholino, e.g., 2-ethoxymorpholino, thiamorpholino, (lower alkyl)thiamorpholino, e.g., 2-methylthiamorpholino, di(lower alkyl)thiamorpholino, e.g., 2,3-diethylthiamorpholino, 2,3-dimethylthiamorpholino, (lower alkoxy)thiamorpholino, e.g., 2-methoxythiamorpholino, piperazino, (lower alkyl)piperazino, e.g., 4-methylpiperazino, 2-methylpiperazino, (hydroxy-lower alkyl)piperazino, e.g., 4-(2-hydroxyethyl)piperazino, di(lower alkyl)piperazino, e.g., 2,3-dimethylpiperazino, (lower alkanoyloxy-lower alkyl)piperazino, e.g., $N^4$-(acetoxyethyl)piperazino, hexamethyleneimino and homopiperazino.

The preferred members of the class defined by formula I are those wherein R, $R^1$ and $R^2$ each is hydrogen, A is thia, the radical II is di(lower alkyl)amino, especially dimethylamino, and the lower alkylene group has three carbon atoms. Preferably, only one $R^3$ is adamantyl and the other $R^3$ then is hydrogen or lower alkyl.

The compounds of this invention are prepared by the following general method (the symbols have the same meaning as previously defined). A compound of the general formula (III)
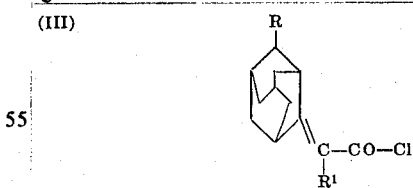

is treated with a compound of the formula (IV)
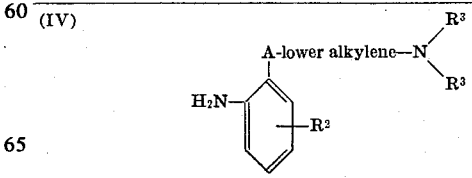

the reaction being carried out in the presence of an inert solvent like benzene, chloroform, methylene chloride, by heating under reflux for 0.5–3 hr., to yield a compound of formula I.

The compounds of formula III are prepared using adamantyl ketones of formula V as starting materials.

(V) 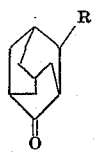

The compound of formula V is reacted with triethylphosphonoacetate and a strong base like potassium t-butoxide or sodium hydride in an inert solvent like 1,2-dimethoxyethane or dioxane to give a compound of the formula (VI) 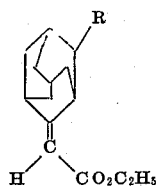

If triethylphosphonoacetate is first reacted with an alkyl halide in an inert solvent like 1,2-dimethoxyethane, dimethylformamide or benzene in the presence of a base like sodium hydride or potassium t-butoxide, and the compound of formula V is made to react with the product of that reaction in a strong base as described previously, there is obtained a compound of the formula wherein $R^1$ is lower alkyl (VII) 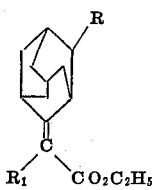

Heating the compound of formula VII with alcoholic potassium hydroxide solution for 2 to 6 hours yields $\Delta^2$,α-adamantane acid of the formula (VIII) 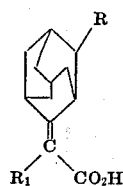

The compound of formula VIII is converted to the acid chloride of formula III by treating with thionyl chloride or oxalyl chloride in a solvent like benzene or chloroform.

Adamantyl ketones of formula V which may be used as starting materials include, for example, 4-methyl-2-adamantanone, 4-ethyl-2-adamantanone, 4-bromo-2-adamantanone, 4-chloro-2-adamantanone and the like.

Adamantyl ketones of formula V are produced from 1-hydroxyadamantanes by heating the latter with an acid like concentrated sulfuric acid for several hours, cooling the reaction mixture and extracting with solvent like ether.

Compounds of formula IV are prepared by reacting a compound of the formula (IX) 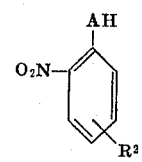

wherein A is oxa or thia and $R^2$ is as hereinbefore defined, with a compound of the formula (X) 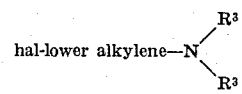

wherein hal represents a halogen, preferably chlorine or bromine and $R^3$ is as hereinbefore defined, the reaction being carried out in the presence of a strong base, such as sodamide, sodium methylate, sodium hydroxide, sodium hydride and potassium hydroxide, to yield a compound of the formula (XI) 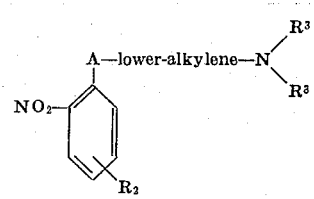

wherein $R^2$, $R^3$ and A are as hereinbefore defined.

Suitable starting materials of the formula IX which may be utilized include: 2-nitrophenol; 2-nitrobenzenethiol; halo-2-nitrophenols, such as 4-chloro-2-nitrophenol, 4-bromo-2-nitrophenol, 5-chloro-2-nitrophenol, 5-bromo-2-nitrophenol, 6-chloro-2-nitrophenol; halo-2-nitrobenzenethiols, such as 4-chloro-2-nitrobenzenethiol, 4-bromo-2-nitrobenzenethiol, 5-chloro-2-nitrobenzenethiol; trifluoromethyl-2-nitrophenols, such as 4-trifluoromethyl-2-nitrophenol and 5-trifluoromethyl-2-nitrophenol; trifluoromethyl-2-nitrobenzenethiols, such as 4-trifluoromethyl-2-nitrobenzenethiol and 5-trifluoromethyl-2-nitrobenzenethiol; (lower alkyl)-2-nitrophenols, such as 4-methyl-2-nitrophenol, 5-ethyl-2-nitrophenol, 4-isopropyl-2-nitrophenol, 5-n-hexyl-2-nitrophenol; (lower alkyl)-2-nitrobenzenethiols, such as 5-methyl-2-nitrobenzenethiol, 4-ethyl-2-nitrobenzenethiol; (lower alkoxy)-2-nitrophenols, such as 4-methoxy-2-nitrophenol, 5-ethoxy-2-nitrophenol, 4-propoxy-2-nitrophenol; (lower alkoxy)2-nitrobenzenethiols, such as 4-methoxy-2-nitrobenzenethiol, 5-ethoxy-2-nitrobenzenethiol; (lower alkanoyl)-2-nitrophenol, such as 4-acetyl-2-nitrophenol, 5-acetyl-2 -nitrophenol, 3-propionyl-2-nitrophenol and 5-hexanoyl-2-nitrophenol; and (lower alkanoyl)-2-nitrobenzenethiols, such as 4-acetyl-2-nitrobenzenethiol, 5-acetyl-2-nitrobenzenethiol, 3-propionyl-2-nitrobenzenethiol and 5-hexanoyl-2-nitrobenzenethiol. These compounds are produced by the classic methods in the literature.

The nitro group in the compound of formula XI is then reduced catalytically, as by treatment with hydrogen in the presence of a hydrogenation catalyst, such as 5 percent palladium-carbon, or chemically, as by treatment with stannous chloride or sodium hydrosulfite, to yield a product of formula VII.

Alternatively, those compounds of this invention wherein A is thia can be prepared by utilizing a compound of the general formula (XII)

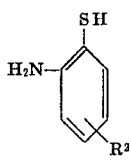

wherein $R^2$ is as hereinbefore defined, to react with a compound of formula X, the reaction being conducted in the presence of a strong base, such as sodamide, to yield a compound of the formula IV wherein A is thia and then reacting this compound with a compound of the formula III as hereinbefore described. Suitable starting materials of the formula XII utilizable in this process are compounds corresponding to the benzenethiols mentioned hereinbefore, with an amino group substituted for the nitro group.

Still another method for preparing the compounds of this invention entails the reaction of a compound of the general formula:

(XIII)

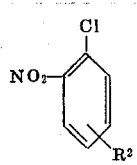

wherein $R^2$ is as hereinbefore defined, with a compound of the general formula:

(XIV)

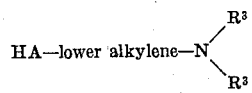

wherein $R^3$ is as hereinbefore defined, the reaction being conducted in the presence of a strong base, such as sodamide, to yield compounds of the general formula XI, which are then treated as described hereinbefore to yield the final product of this invention.

When A is sulfonyl, these compounds of formula I may be obtained from the compounds of formula I wherein A is thia by oxidation with a suitable oxidizing agent such as hydrogen peroxide, potassium permanganate or a peracid such as peracetic acid.

Those compounds wherein A is carbonyl are obtained by reaction of a 2'-nitroacylphenone, such as 2'-nitroacetophenone or 2'-nitropropiophenone with formaldehyde and an amine. Alternately, the 2'-nitroacylphenone may be condensed with a basic halide to yield the desired nitro compound, which may then be reduced and acylated.

When A is hydroxymethylene, such compounds are obtained by the reduction with sodium borohydride of a compound of formula I in which A is carbonyl.

The symbols in all of the above formulas have the same meaning and hal refers to halogen, preferably chlorine or bromine.

The bases of formula I form acid addition salts by reaction with the common inorganic and organic acids. Such inorganic salts as the hydrohalides, e.g., hydrobromide, hydrochloride, hydroiodide, sulfates nitrates, phosphates, borates, etc., and organic salts as acetate, oxalate, tartrate, malate, citrate, succinate, benzoate, ascorbate, salicylate, theophyllinate, camphorsulfonate, alkanesulfonate, e.g., methanesulfonate, arylsulfonate, e.g., benzenesulfonate, toluenesulfonate and the like are also within the scope of the invention. It is frequently convenient to effect the purification of the product by forming the acid salt. The base may be obtained therefrom by neutralization with an alkali hydroxide such as sodium hydroxide.

The compounds of this invention are substances which are useful in cardiovascular disorders. They are useful, for example, in the suppression of cardiac arrhythmia, particularly ventricular fibrillation, in animal species such as mice or dogs in which case they may be administered orally or parenterally, at a dosage of about 0.2 to 8 mg/kg/day in single or divided doses, preferably about 0.1 to 2 mg/kg two to four times daily orally, in the form of tablets, capsules, elixirs, injectables or the like by incorporating the base of formula I or a physiologically acceptable acid addition salt thereof in a conventional vehicle along with excipients, lubricants, stabilizers, and the like according to accepted pharmaceutical practice. They also inhibit serotonin at slightly higher levels.

The following examples are illustrative of the invention. All temperatures are expressed on the centigrade scale.

EXAMPLE 1

2'-[[3-(Dimethylamino)propyl]thio]$\Delta^2$,$\alpha$-adamantaneacetanilide hydrochloride a. 2-Adamantanone A mixture of 100 ml. of concentrated $H_2SO_4$ and 24.6 g. (0.16 mole) of 1-hydroxyadamantane is heated with stirring on the steam bath for 4.5 hr. At the end of the period, the dark red solution is poured onto crushed ice, and the mixture is extracted with 300 ml. of ether. After washing the ether layer to neutrality, it is dried ($MgSO_4$). Evaporation of the ether gives 15.0 g. (62 percent) of 2-adamantanone as a white solid which is further purified by steam distillation followed by crystallization from cyclohexane; m.p. 260°–265°.

b. $\Delta^2$,$\alpha$-Adamantaneacetic acid, ethyl ester

To a well stirred suspension of 2.8 g. of sodium hydride dispersed in 75 ml. of dry 1,2-dimethoxyethane, 13.45 g. (0.06 mole) of triethylphosphonoacetate are added dropwise at 20° (addition time 1 hr.). After the addition, the mixture is stirred for an hour at room temperature. To the resulting yellow solution, a solution of 9.0 g. (0.06 mole) of 2-adamantanone in 75 ml. of dry 1,2-dimethoxyethane is added at such a rate as to maintain the temperature between 28°–30°. The mixture is then stirred overnight at room temperature. The mixture is concentrated, diluted with 100 ml. of water, and extracted with 3 × 300 ml. of ether. After drying (MgSO₄) the ether is removed in vacuo to give 10.3 g. (77 percent) of $\Delta^2,\alpha$-adamantaneacetic acid, ethyl ester, as a thick oil which is used as such for the next step.

c. $\Delta^2,\alpha$-Adamantaneacetic acid

To a solution of 10.3 g. of the product of part (b) in 250 ml. of ethyl alcohol, 150 ml. of an aqueous KOH solution (25 percent) is added and the mixture heated under reflux for 4 hr. The mixture is concentrated in vacuo, diluted with water and extracted with chloroform (200 ml.) to remove the insoluble impurities. The basic solution is cooled, acidified with 5 N HCl, and the solid which separates is extracted with chloroform (3 × 250 ml.). The chloroform solution is washed with water, dried (MgSO₄) and evaporated in vacuo to give 6.8 g. (79 percent) of $\Delta^2,\alpha$-adamantaneacetic acid as a brownish-white powder which is crystallized from dilute acetone to give yellowish needles; m.p. 136°–138°.

d. $\Delta^2,\alpha$-Adamantaneacetic acid chloride

To a solution of 3 ml. of oxalyl chloride in 25 ml. of dry benzene, a solution of 0.96 g. (0.0005 mole) of the product of part (c), in 25 ml. of dry benzene is added. After the initial evolution of gas has subsided, the reaction mixture is stirred and heated to reflux for 1 hour. The solvent is removed in vacuo, 25 ml. of dry ether is added to the residue, and the solvent is evaporated to give a thick oil which solidifies to a semi-solid.

e. 2'-[[3-(Dimethylamino)propyl]thio]-$\Delta^2,\alpha$-adamantaneacetanilide hydrochloride To a solution of the product of part (d) in 25 ml. of dry benzene, a solution of 1.05 g. (0.05 mole) of 3-(dimethylamino)propylthioaniline in 75 ml. of benzene is added. The mixture is stirred at room temperature for 2 hours, and then heated under reflux for 0.25 hr. The reaction mixture is cooled, concentrated and the precipitate 2.0 g. (95 percent) is crystallized from acetonitrile-ether to give 1.8 g. (86 percent) of the product as white crystals, m.p. 130°–132°.

Following the same procedure of Example 1 (e) but substituting an equivalent amount of substituted aniline of formula A below for 2-(3-dimethylaminopropylthio)aniline, the corresponding substituted $\Delta^2,\alpha$-adamantaneacetanilide hydrochloride of formula B below is obtained.

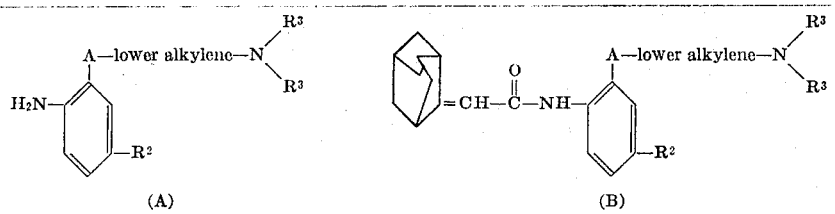

(A)                                                      (B)

| Example | A | Lower alkylene | R² | R³ / —N(R³)(R³) |
|---|---|---|---|---|
| 2 | O | (CH₂)₂ | H | —N(CH₃)₂ |
| 3 | S | (CH₂)₃ | H | —NH(1-adamantyl) |
| 4 | S | (CH₂)₂ | H | —N(CH₂CH₂)(CH₂CH₂)N—CH₃ |
| 5 | S | (CH₂)₃ | 6-CF₃ | —N(C₂H₅)₂ |
| 6 | O | (CH₂)₂ | 4-CH₃ | —N(CH₂CH₂)(CH₂CH₂)N—CH₃ |
| 7 | O‖C | (CH₂)₃ | H | —NHCH(CH₃)₂ |
| 8 | CH(OH) | (CH₂)₃ | 5-OCH₃ | —N(CH₃)₂ |

EXAMPLE 9 a. 2'-(3-dimethylaminopropylsulfonyl)-$\Delta^2,\alpha$-adamantaneacetanilide oxalic acid salt An aqueous solution of 5.0 g. of 2'-(3-dimethylaminopropylthio)-$\Delta^2,\alpha$-adamantaneacetanilide hydrochloride is made basic to pH 10.5 by the addition of aqueous sodium hydroxide, and extracted with ether. The combined ether extracts are dried over anhydrous MgSO₄ and the solvent is removed in vacuo. The residue is dissolved in 25 ml. of glacial acetic acid and treated with 7 ml. of 30 percent hydrogen peroxide and allowed to stand overnight at room temperature. The reaction mixture is cooled, diluted with water (150 ml.) and basified to pH 10.5 and extracted with ether. The combined ether extracts are dried over anhydrous magnesium sulfate and treated with a saturated solution of oxalic acid in ether. The precipitated solid is collected and crystallized from ethanol-ether to give 2'-(3-dimethylaminopropyl-sulfonyl)-$\Delta^2,\alpha$-adamantaneacetanilide oxalic acid salt.

Following the procedure of Example 1 (steps a, b, c and d) but substituting an equivalent amount of a substituted 2-adamantanone of formula C below, the corresponding 2'-(3-dimethyl-aminopropylthio)-$\Delta^2,\alpha$-(substituted)-adamantaneacetanilide)hydrochloride of formula D below is obtained.

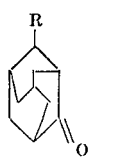

(C)

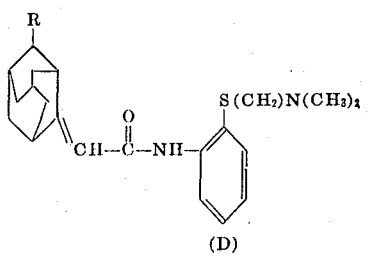

(D)

| Example | R |
|---|---|
| 10 | CH$_3$ |
| 11 | C$_2$H$_5$ |
| 12 | Br |
| 13 | Cl |

EXAMPLE 14

2'-(3-dimethylaminopropylthio)-Δ$^2$,α-adamantanepropionanilide hydrochloride a. Δ$^2$,α-adamantanepropionic acid, ethyl ester To a well stirred suspension of 2.8 g. of sodium hydride dispersed in 100 ml. of dry 1,2-dimethoxyethane, a solution of 13.2 g. (0.06 mole) of Δ$^2$,α-adamantaneacetic acid ethyl ester in 50 ml. of dry 1,2-dimethoxy-ethane is added dropwise at room temperature. After the evolution of hydrogen has stopped, a solution of 7.6 g. of methyl iodide in 50 ml. of 1,2-dimethoxyethane is added dropwise, and the mixture refluxed for 3 hours. The mixture is concentrated, diluted with water, and extracted with ether. After drying (MgSO$_4$) the ether is removed in vacuo to give Δ$^2$,α-adamantanepropionic acid, ethyl ester.

b. 2'-(3-dimethylaminopropylthio)-Δ$^2$,α-adamantanepropionanilide hydrochloride Following the procedure of Example 1 (c, d and e), but substituting Δ$^2$,α-adamantanepropionic acid ethyl ester for Δ$^2$,α-adamantaneacetic acid ethyl ester there is obtained 2'-(3-dimethylaminopropylthio)-Δ$^2$,α-adamantanepropionanilide hydrochloride.

What is claimed is:

1. A compound of the formula

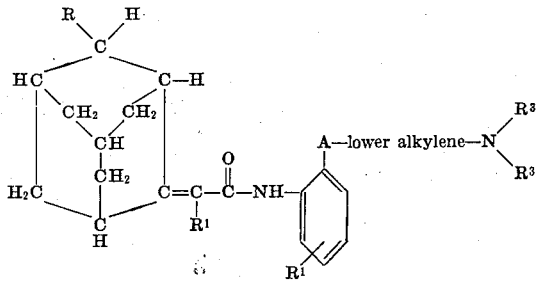

wherein R is hydrogen, halogen or lower alkyl, R$^1$ is hydrogen or lower alkyl, R$^2$ is hydrogen, halogen, trifluoromethyl, nitro, amino, lower alkyl, lower alkoxy or lower alkanoyl; A is oxa, thia, sulfonyl, carbonyl or hydroxymethylene and

is amino, lower alkylamino, di(lower alkyl)amino, (hydroxy-lower alkyl)amino, (phenyl-lower alkyl)amino, 1-adamantylamino, N-(lower alkyl)-(phenyl-lower alkyl)amino, piperidino, di(lower alkyl)piperidino, (lower alkoxy)piperidino, (lower alkyl)piperidino, pyrrolidino, (lower alkyl)pyrrolidino, di(lower alkyl)pyrrolidino, (lower alkoxy)pyrrolidino, morpholino, (lower alkyl)morpholino, di(lower alkyl)morpholino, (lower alkyl)thiamorpholino, di(lower alkyl)thiamorpholino, (lower alkoxy)thiamorpholino, piperazino, (lower alkyl)piperazino, (hydroxy-lower alkyl)piperazino, di(lower alkyl)piperazino, (lower alkanoyl-lower alkyl)piperazino, hexamethyleneimino or homopiperazino, and acid addition salt thereof.

2. A compound as in claim 1 wherein R, R$^1$ and R$^2$ each is hydrogen, A is thia and each R$^3$ is lower alkyl.

3. A compound as in claim 2 wherein each lower alkyl group is methyl and the lower alkylene group is trimethylene.

4. A compound as in claim 1 wherein R, R$^1$ and R$^2$ each is hydrogen, A is oxa and each R$^3$ is lower alkyl.

5. A compound as in claim 4 wherein each lower alkyl group is methyl and the lower alkylene group is trimethylene.

6. A compound as in claim 1 wherein R is lower alkyl, R$^1$ and R$^2$ each is hydrogen, A is thia and each R$^3$ is lower alkyl.

7. A compound as in claim 6 wherein each lower alkyl group is methyl and the lower alkylene group is trimethylene.

8. A compound as in claim 1 wherein R and R$^1$ each is hydrogen, R$^2$ is lower alkyl, A is thia and each R$^3$ is lower alkyl.

9. A compound as in claim 1 wherein R and R$^2$ each is hydrogen, R$^1$ is lower alkyl, A is oxa and each R$^3$ is lower alkyl.

10. A compound as in claim 8 wherein each lower alkyl group is methyl and the lower alkylene group is trimethylene.

11. A compound as in claim 1 wherein

is amino, lower alkylamino, di(lower alkyl)amino, (hydroxy-lower alkyl)amino, piperidino, N$^4$-lower alkylpiperazino, N$^4$-(hydroxy-lower alkyl)piperazino, morpholino or thiamorpholino.

* * * * *